(12) United States Patent
Chang et al.

(10) Patent No.: US 11,874,964 B1
(45) Date of Patent: Jan. 16, 2024

(54) GLOVE

(71) Applicant: HTC Corporation, Taoyuan (TW)

(72) Inventors: Li-Hsun Chang, Taoyuan (TW); Kuan-Ying Ou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/073,564

(22) Filed: Dec. 2, 2022

(51) Int. Cl.
*G06F 3/14* (2006.01)
*G06F 3/01* (2006.01)

(52) U.S. Cl.
CPC .................................. *G06F 3/014* (2013.01)

(58) Field of Classification Search
CPC ....................................................... G06F 3/014
See application file for complete search history.

(56) References Cited

U.S. PATENT DOCUMENTS

| 8,652,076 | B2 | 2/2014 | Land et al. | |
|---|---|---|---|---|
| 9,030,307 | B1* | 5/2015 | Lee .......................... | G06F 3/017 340/407.1 |
| 11,194,393 | B2 | 12/2021 | Wang et al. | |
| 2017/0165567 | A1* | 6/2017 | Walters .................. | A63F 13/285 |
| 2019/0339773 | A1* | 11/2019 | Holbery .................. | G06F 3/014 |

FOREIGN PATENT DOCUMENTS

| CN | 107015653 | 8/2017 |
|---|---|---|
| CN | 107209582 | 9/2017 |
| CN | 112426328 | 3/2021 |
| TW | 202136971 | 10/2021 |

OTHER PUBLICATIONS

"Office Action of Taiwan Counterpart Application", dated Mar. 29, 2023, p. 1-p. 8.

* cited by examiner

*Primary Examiner* — Towfiq Elahi
(74) *Attorney, Agent, or Firm* — JCIPRNET

(57) ABSTRACT

A glove includes a body, a hand-back base, a fingertip base, an elastic element, a control wire, a shape memory alloy element, a braking element and a processor. The body is used for wearing on a hand of a user. The hand-back base is disposed on a hand-back part of the body. The fingertip base is disposed on a fingertip part of the body. The elastic element is connected between the hand-back base and the control wire. The control wire is connected between the fingertip base and the elastic element. The processor is disposed on the body and is used for electronically controlling the shape memory alloy element to actuate the braking element to brake the control wire.

6 Claims, 3 Drawing Sheets

GLOVE

BACKGROUND

Technical Field

The application relates to a glove.

Description of Related Art

With the rapid evolution of electronic technology and image processing technology, Virtual Reality (VR) constructed by computers has gradually been widely used in information dissemination, entertainment or display. Today's virtual reality products all emphasize human-computer interaction, whether it is an interactive training simulator, an interactive toy, or an interactive video game, and users can operate through equipment such as a head-mounted display and control handles. Among them, the picture of the virtual reality comes from the head-mounted display, and the control handles are used to operate the objects in the virtual reality. For example, the user operates the buttons on the control handles or the touchpad to cooperate with various actions such as grabbing, clicking or throwing in the virtual reality.

However, using control handles to grab, click or throw virtual objects is not in line with the actual actions of the human body. It also cannot reflect the size of virtual objects, so it is relatively impossible to produce more immersive experiences in the virtual world.

SUMMARY

The application provides a glove to provide an immersive experience of a virtual world.

The glove of the application includes a body, a hand-back base, a fingertip base, an elastic element, a control wire, a shape memory alloy element, a braking element and a processor. The body is used for wearing on a hand of a user. The hand-back base is disposed on a hand-back part of the body. The fingertip base is disposed on a fingertip part of the body. The elastic element is connected between the hand-back base and the control wire. The control wire is connected between the fingertip base and the elastic element. The processor is disposed on the body and is used for electronically controlling the shape memory alloy element to actuate the braking element to brake the control wire.

Based on the above, in the glove of the application, the control wire is braked with the shape memory alloy element and the braking element, which can simulate the hand feeling of grabbing an object, so as to provide an immersive experience in the virtual world.

DESCRIPTION OF THE EMBODIMENTS

Figure 1:
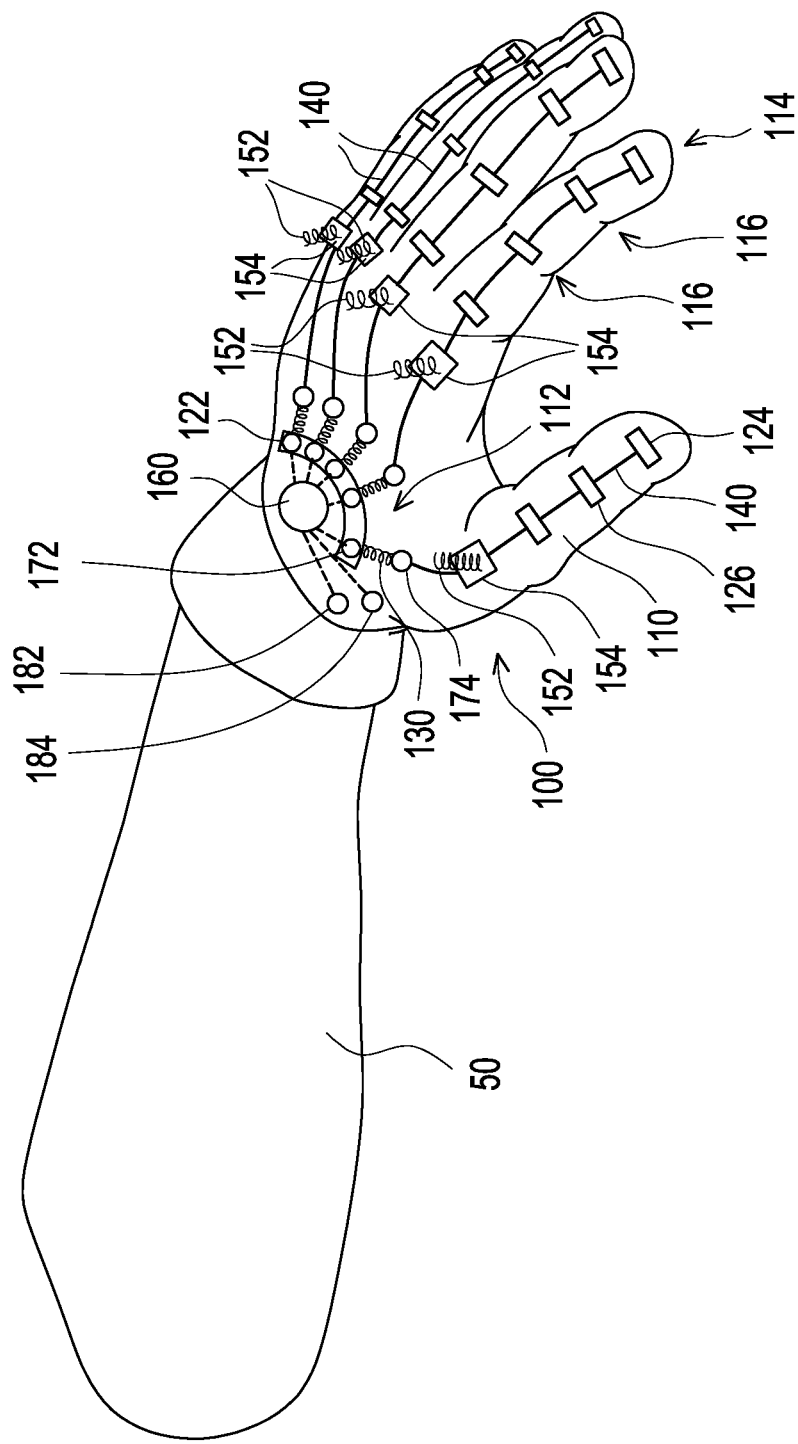
FIG. 1 is a schematic diagram of a wearing state of a glove according to an embodiment of the invention.

FIG. 1 is a schematic diagram of a wearing state of a glove according to an embodiment of the invention. Referring to FIG. 1, the glove 100 of the embodiment includes a body 110, a hand-back base 122, a fingertip base 124, an elastic element 130, a control wire 140, a shape memory alloy element 152 (shown in FIG. 2), a braking element 154 and a processor 160. The body 110 is used for wearing on a hand 50 of a user. The hand-back base 122 is disposed on a hand-back part 112 of the body 110. The fingertip base 124 is disposed on a fingertip part 114 of the body 110. The elastic element 130 is connected between the hand-back base 122 and the control wire 140. The control wire 140 is connected between the fingertip base 124 and the elastic element 130. The processor 160 is disposed on the body 110 and is used for electronically controlling the shape memory alloy element 152 to actuate the braking element 154 to brake the control wire 140.

In the glove 100 of the embodiment, the cooperation of the shape memory alloy element 152 and the braking element 154 can brake the control wire 140, thereby controlling the bending degree of the user's fingers. Therefore, when it is sensed that the user may have touched a virtual object 60 in the virtual world, the control wire 140 may be braked, so that the user's finger corresponding to the control wire 140 is restrained and cannot continue to bend. In this way, it provides the feedback feeling as if the finger touches the object in the real world, allowing the user to have the illusion of grasping the real object. After the user releases the virtual object 60, the elastic member 130 will pull the control wire 140 back to help manage the wire. The components used in the glove 100 of the embodiment have the advantages of light weight and small size, which can improve the situation that the existing technology needs to use bulky motors and other large-volume accessories that spoil the user experience.

Figure 2:
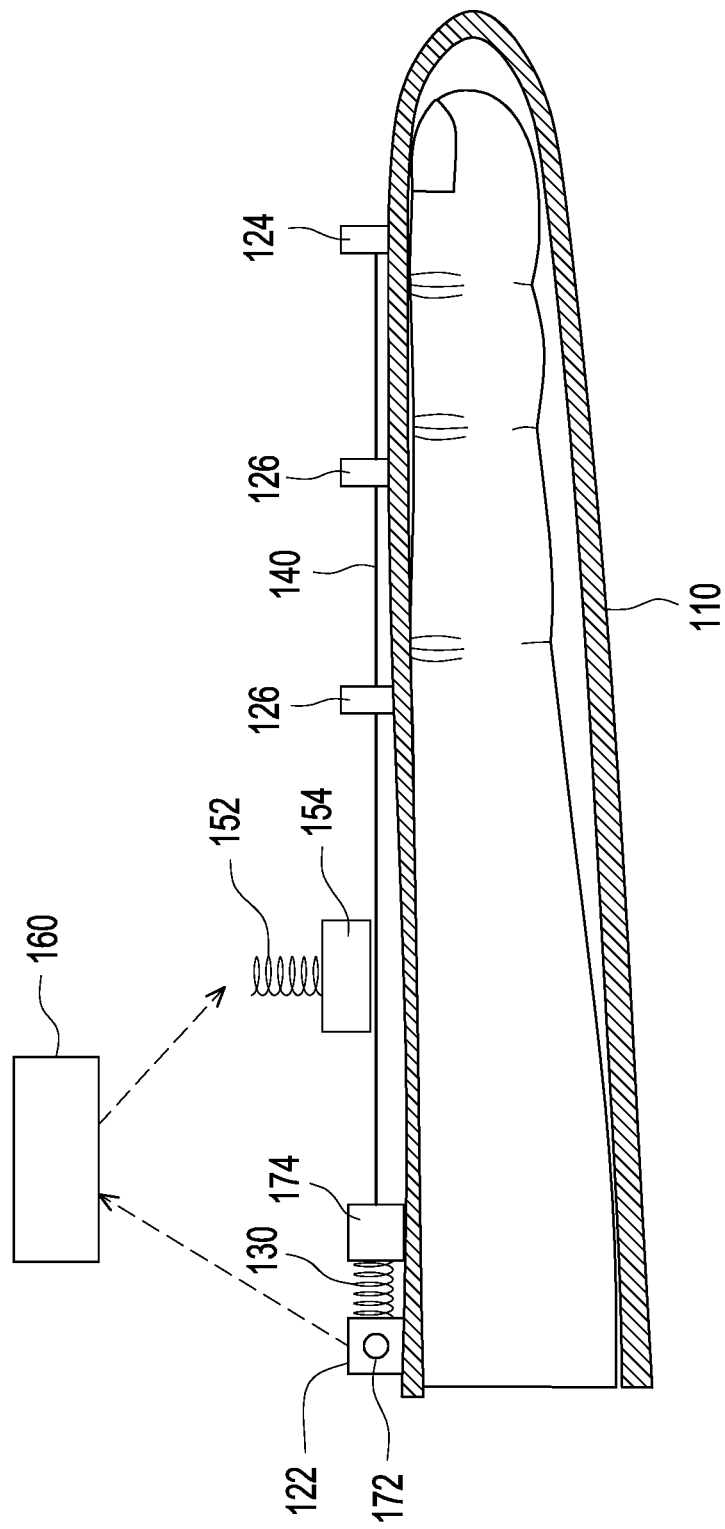
FIG. 2 is a schematic partial cross-sectional view of the glove of FIG. 1.

FIG. 2 is a schematic partial cross-sectional view of the glove of FIG. 1. Referring to FIG. 2, when the user does not bend the finger, the elastic element 130 will pull the control wire 140 to keep it in a taut state with an appropriate force.

Figure 3:
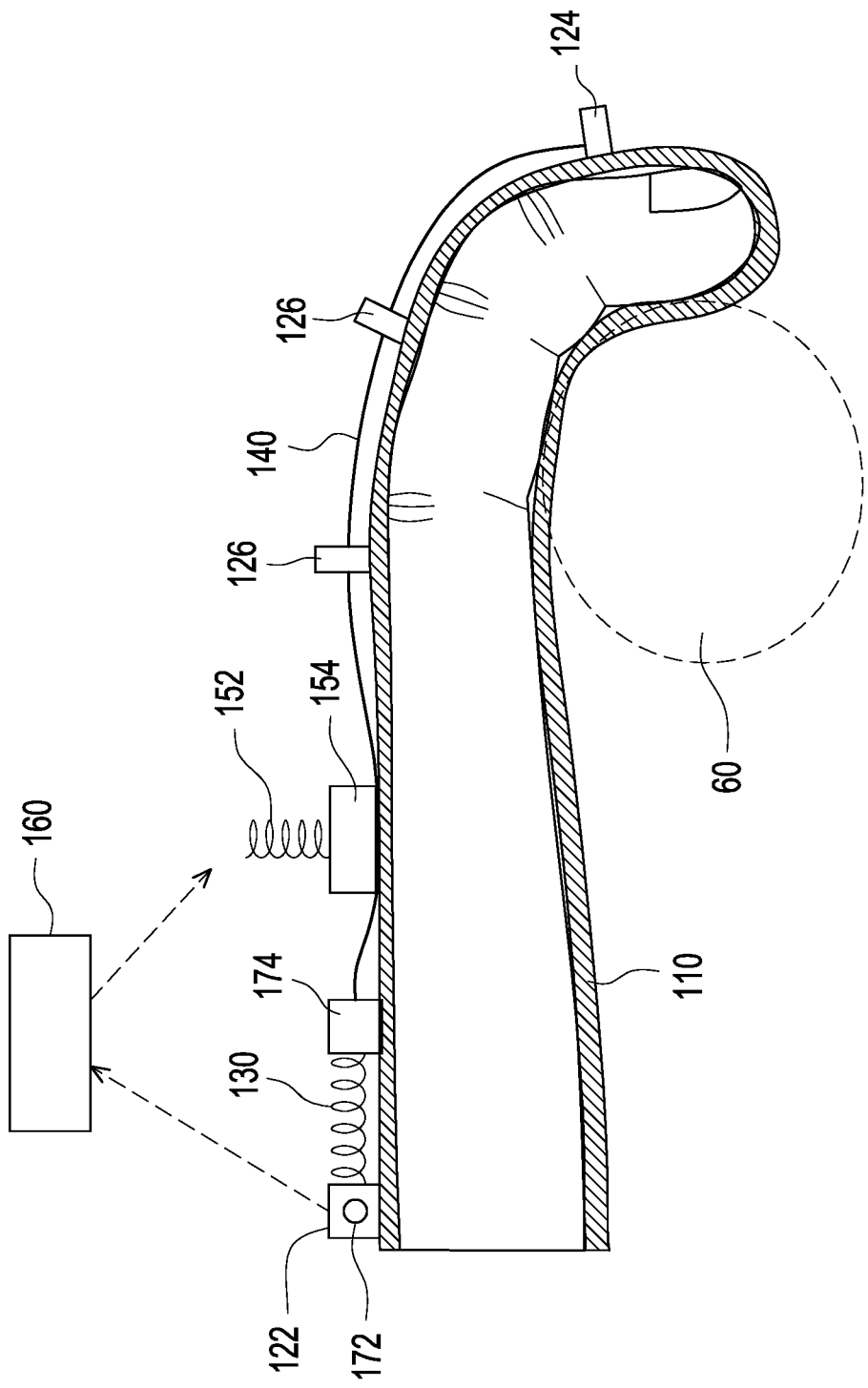
FIG. 3 is a schematic partial cross-sectional view of the glove of FIG. 1 in another state.

FIG. 3 is a schematic partial cross-sectional view of the glove of FIG. 1 in another state. Referring to FIG. 3, for example, in the embodiment, when the shape memory alloy element 152 is energized and heated, it will stretch to make the braking element 154 move down, and contact the body 110 to clamp the control wire 140 together, so that the control wire 140 cannot move. Therefore, the finger corresponding to the control wire 140 will also be restrained and cannot continue to bend. In other embodiments, the braking element 154 can also include two parts, and these two parts are driven by the shape memory alloy element 152 to clamp the control wire 140. Alternatively, other different forms of cooperation between the braking element 154 and the shape memory alloy element 152 can be applied to the application.

In the embodiment, the glove 100 further includes a magnetic sensor 172 and a magnet 174, which is respectively set at the opposite ends of the elastic element 130. The magnetic sensor 172 is electrically connected to the processor 160. When the user bends the finger, the fingertip base 124 pulls the control wire 140, and the control wire 140 pulls the magnet 174. During the process, the distance between the magnet 174 and the magnetic sensor 172 changes, so the intensity of the magnetic field generated by the magnet 174 sensed by the magnetic sensor 172 will also change accordingly. According to the change of the intensity of the magnetic field sensed by the magnetic sensor 172, the bending degree of the user's finger can be calculated, and then it can be known whether the user's finger should have touched the virtual object 60. The sensing result of the magnetic sensor 172 can be transmitted to the processor 160, so that the processor 160 actuates the shape memory alloy element 152 when determine that the user's finger has touched the virtual object 60. Thereby, the control wire 140 is braked by the braking element 154.

In the embodiment, the magnet 174 is set at one end of the elastic element 130 connected to the control wire 140, and the magnetic sensor 172 is set on the hand-back base 122. In another embodiment, the positions of the magnetic sensor 172 and the magnet 174 can also be reversed, which is not limited in the application.

In the embodiment, the number of the fingertip base 124, the elastic element 130, the control wire 140, the shape memory alloy element 152 and the braking element 154 may correspond to the number of fingers, but the application does not limit it. Besides, the glove 100 may further includes a plurality of knuckle bases 126, which is set on a plurality of knuckles 116 of the body 110. The control wire 140 passes through the knuckles 116.

Referring to FIG. 1, in the embodiment, the glove 100 may further includes a tracker 182, which is set on the body 110. Besides, the glove 100 may also include a tracking signal transmitter 184, which is set on the body 110. The glove 100 may include both the tracker 182 and the tracking signal transmitter 184, or only one of them. The individual number of the tracker 182 and the tracking signal transmitter 184 may also be multiple. Besides, the processor 160 is used for receiving position information and size information of the virtual object 60. For example, the tracker 182 can be adapted to detect a signal from a signal source (not shown), and transmit it to the processor 160 to generate a corresponding sensing signal, and then wirelessly transmit the sensing signal to the host (not shown). At this time, the tracker 182 is, for example, an infrared light sensor or other invisible light sensor, an electromagnetic signal sensor such as a Hall-effect sensor, an acoustic wave sensor such as a microphone, a Radio frequency detector, etc., but the application is not limited thereto. In another embodiment, the tracker 182 can also be a camera module, so as to generate three-dimensional coordinate position data. Alternatively, the tracker 182 can also be an Inertial measurement unit (IMU), so as to generate three-dimensional coordinate position data. Similarly, the tracking signal transmitter 184 can emit infrared light, invisible light, electromagnetic signal, sound wave signal, RF signal, etc., but the application is not limited thereto.

The host obtains the three-dimensional coordinate position of the glove in space based on the tracker 182 and/or the tracking signal transmitter 184. Based on this, the host can notify the processor 160 when the glove 100 is close to the virtual object 60. Moreover, the processor 160 calculates whether the user's finger touches the virtual object 60 according to the position information and size information of the virtual object 60 and the sensing result of the magnetic sensor 172.

In summary, in the glove of the application, the actuation control wire can limit the bending of the user's fingers, simulating the real feeling of grabbing objects, so as to provide an immersive experience in the virtual world. Moreover, because the shape memory alloy element and braking element used to actuate the control wire are small in size and light in weight, the immersive experience of the user is further enhanced.

What is claimed is:

1. A glove comprising:
a body, used for wearing on a hand of a user;
a hand-back base, disposed on a hand-back part of the body;
a fingertip base, disposed on a fingertip part of the body;
an elastic element;
a control wire, wherein the elastic element is connected between the hand-back base and the control wire, and the control wire is connected between the fingertip base and the elastic element;
a shape memory alloy element;
a braking element;
a processor, disposed on the body, is used for electronically controlling the shape memory alloy element to actuate the braking element to brake the control wire; and
a magnetic sensor and a magnet, respectively set at the opposite ends of the elastic element, wherein the magnetic sensor is electrically connected to the processor.

2. The glove according to claim 1, wherein the magnet is set at one end of the elastic element connected to the control wire.

3. The glove according to claim 1, further comprises a plurality of knuckle bases, arranged on a plurality of knuckles of the body, wherein the control wire passes through the knuckles.

4. The glove according to claim 1, further comprises a tracker, set on the body.

5. The glove according to claim 1, further comprises a tracking signal transmitter, set on the body.

6. The glove according to claim 1, wherein the processor is used for receiving position information and size information of a virtual object.

* * * * *